United States Patent
Hong et al.

(10) Patent No.: US 9,445,075 B2
(45) Date of Patent: Sep. 13, 2016

(54) IMAGE PROCESSING APPARATUS AND METHOD TO ADJUST DISPARITY INFORMATION OF AN IMAGE USING A VISUAL ATTENTION MAP OF THE IMAGE

(71) Applicant: SAMSUNG ELECTRONICS CO., LTD., Suwon-si (KR)

(72) Inventors: Ji Young Hong, Seongnam-si (KR); Yang Ho Cho, Hwaseong-si (KR); Ho Young Lee, Suwon-si (KR); Kyu Young Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/746,024

(22) Filed: Jun. 22, 2015

(65) Prior Publication Data
US 2015/0288946 A1     Oct. 8, 2015

Related U.S. Application Data

(63) Continuation of application No. 13/661,833, filed on Oct. 26, 2012, now Pat. No. 9,064,319.

(30) Foreign Application Priority Data

Nov. 1, 2011 (KR) .................... 10-2011-0112603

(51) Int. Cl.
*H04N 13/00* (2006.01)
*G06T 7/00* (2006.01)
(Continued)

(52) U.S. Cl.
CPC ......... *H04N 13/0022* (2013.01); *G06T 7/0081* (2013.01); *G06T 15/04* (2013.01); *H04N 13/0011* (2013.01); *H04N 13/0037* (2013.01); *H04N 13/0422* (2013.01); *G06K 9/4628* (2013.01); *G06T 2200/04* (2013.01);
(Continued)

(58) Field of Classification Search
None
See application file for complete search history.

(56) References Cited

U.S. PATENT DOCUMENTS 7,330,172 B2   2/2008   Itoh et al.
7,385,600 B2   6/2008   Marion
(Continued)

FOREIGN PATENT DOCUMENTS

CN   102187681 A   9/2011
EP   2175664 A1   4/2010
(Continued)

OTHER PUBLICATIONS

O. Marques, L.M. Mayron, D. Socek, G.B. Borba, H.R. Gamba, An attention-based method for extracting salient regions of interest from stereo images, 2007, Proceedings of International Conference on Computer Vision Theory and Applications, pp. 143-148.*

(Continued)

*Primary Examiner* — Said Broome
(74) *Attorney, Agent, or Firm* — NSIP Law

(57) ABSTRACT

Provided is an image processing apparatus. A region of interest (ROI) configuration unit may generate a visual attention map according to a visual attention of a human in correspondence to an input three dimensional (3D) image. A disparity adjustment unit may adjust disparity information, included in the input 3D image, using the visual attention map. Using the disparity information adjusted result, a 3D image having a decreased visual fatigue may be generated and be displayed.

12 Claims, 11 Drawing Sheets

(51) Int. Cl.
*G06T 15/04* (2011.01)
*H04N 13/04* (2006.01)
*G06K 9/46* (2006.01)

(52) U.S. Cl.
CPC .............. *G06T2207/10024* (2013.01); *H04N 2013/0077* (2013.01); *H04N 2013/0081* (2013.01)

(56) References Cited

U.S. PATENT DOCUMENTS

| | | |
|---|---|---|
| 2007/0247522 A1 | 10/2007 | Holliman |
| 2010/0086200 A1* | 4/2010 | Stankiewicz et al. .......... 382/154 |
| 2010/0189354 A1 | 7/2010 | de Campos et al. |
| 2011/0109720 A1* | 5/2011 | Smolic ............... H04N 13/0011 348/43 |
| 2011/0141306 A1 | 6/2011 | Nakano et al. |
| 2011/0229012 A1 | 9/2011 | Singhal |
| 2011/0249886 A1 | 10/2011 | Park et al. |

FOREIGN PATENT DOCUMENTS

| | | |
|---|---|---|
| KR | 10-2005-0078328 A | 2/2005 |
| KR | 10-2008-0100242 A | 11/2008 |
| KR | 10-2009-0037270 A | 4/2009 |
| KR | 10-2010-0122988 A | 11/2010 |
| KR | 10-2011-0004267 A | 1/2011 |
| KR | 10-2011-0037472 A | 4/2011 |
| KR | 10-2011-0071217 A | 6/2011 |

OTHER PUBLICATIONS

Marques, O. et al. "An attention-based method for extracting salient regions of interest from stereo images," VISAPP (2), 2007 (pp. 294-297).

Extended European Search Report issued on May 14, 2013 in counterpart European Application No. 12190356.1 (7 pages).

Chinese Office Action issued on Apr. 25, 2016 in counterpart Chinese Application No. 201210423115.2 (19 pages in Chinese with English translation).

* cited by examiner

IMAGE PROCESSING APPARATUS AND METHOD TO ADJUST DISPARITY INFORMATION OF AN IMAGE USING A VISUAL ATTENTION MAP OF THE IMAGE

CROSS-REFERENCE TO RELATED APPLICATIONS

This application is a continuation of U.S. application Ser. No. 13/661,833 filed Oct. 26, 2012, which claims the priority benefit of Korean Patent Application No. 10-2011-0112603, filed on Nov. 1, 2011, in the Korean Intellectual Property Office, the disclosure of which is incorporated herein by reference.

BACKGROUND

1. Field

Example embodiments relate to a display device to provide a three dimensional (3D) image and an internal image processing method, and more particularly, to an image processing apparatus and method that may decrease a visual fatigue when viewing a 3D image.

2. Description of the Related Art

Recently, interest on a three dimensional (3D) image is increasing. The 3D image may be configured by providing images corresponding to different views with respect to a plurality of views. For example, the 3D image may be a multi-view image corresponding to a plurality of views, or a stereoscopic image that may provide a left eye image and a right eye image corresponding to two views.

Compared to a two dimensional (2D) display of displaying only an existing plane image, a 3D display may directly transfer the relatively high sense of reality to a user. However, the 3D display may express different image information with respect to a left field of view and a right field of view and thus, may cause a visual fatigue compared to the 2D display. Accordingly, there is a desire for a solution to decrease the visual fatigue.

As a conventional art for decreasing the visual fatigue, proposed are a method of uniformly decreasing depth information, a method of increasing a contrast in the case of a near side region and decreasing the contrast in the case of a far side region, and the like.

SUMMARY

The foregoing and/or other aspects are achieved by providing an image processing apparatus, including a region of interest (ROI) configuration unit to generate a visual attention map according to a visual attention of a human in correspondence to an input three dimensional (3D) image, and a disparity adjustment unit to adjust disparity information, included in the input 3D image, using the visual attention map.

The ROI configuration unit may include a region divider to divide, into a plurality of regions, a depth value distribution included in the input 3D image, using disparity information of the input 3D image, and at least one region calculator to calculate a visual attention level corresponding to each of the plurality of regions.

The ROI configuration unit may further include a visual attention map calculator to generate the visual attention map by integrating visual attention levels of the plurality of regions calculated by the at least one region calculator.

The at least one region calculator may change a color space of the input 3D image, may classify each portion of the input 3D image into an attractive color and an unattractive color, and may calculate a visual attention level of the attractive color to be higher than a visual attention level of the unattractive color.

Change of the color space may be to change the color space to CIECAM02 color space when the input 3D image is associated with red, green, blue (RGB) color space, and classification of each portion into the attractive color and the inattention may be performed based on a hue and a chroma of color values.

When a lightness difference between frames is greater than or equal to a predetermined threshold based on lightness information determined using color information of the input 3D image, the at least one region calculator may calculate the visual attention level to be high.

The at least one region calculator may divide the input 3D image into blocks of a predetermined size. When a difference of pixel values with respect to a block positioned at the same position within different two frames is greater than or equal to the predetermined threshold, the at least one region calculator may determine the block as a motion detection block and calculates a visual detection level of the block to be high.

The at least one region calculator may group the blocks into a plurality of groups. When a predetermined number of motion detection blocks are present within a single group, the at least one region calculator may calculate a visual attention level of the entire blocks within the single group to be high.

When a lightness value determined using color information of the input 3D image is less than a predetermined threshold, the at least one region calculator may calculate the visual attention level to be low.

The image processing apparatus may further include a perceived depth enhancement processing unit to enhance a perceived depth by applying a texture enhancement scheme based on a texture type of a predetermined region on the visual attention map that is generated according to the visual attention.

The foregoing and/or other aspects are achieved by providing an image processing apparatus, including a ROI configuration unit to generate a visual attention map corresponding to an input 3D image based on at least one of a color value of the input 3D image, a disparity value, and a motion detection result, and a disparity adjustment unit to readjust a disparity of the input 3D image using the visual attention map.

The foregoing and/or other aspects are achieved by providing an image processing method, including generating, by a ROI configuration unit of an image processing apparatus, a visual attention map according to a visual attention of a human in correspondence to an input 3D image, and adjusting, by a disparity adjustment unit of the image processing apparatus using the visual attention map, disparity information that is included in the input 3D image.

The example embodiments may include an image processing apparatus and method that may maintain 3D effect as is and decrease a visual fatigue based on a human visual system characteristic.

The example embodiments may also include an image processing apparatus and method that may efficiently select a ROI based on a visual attention and may minimize a decrease in the 3D effect that may occur due to the decreased visual fatigue.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
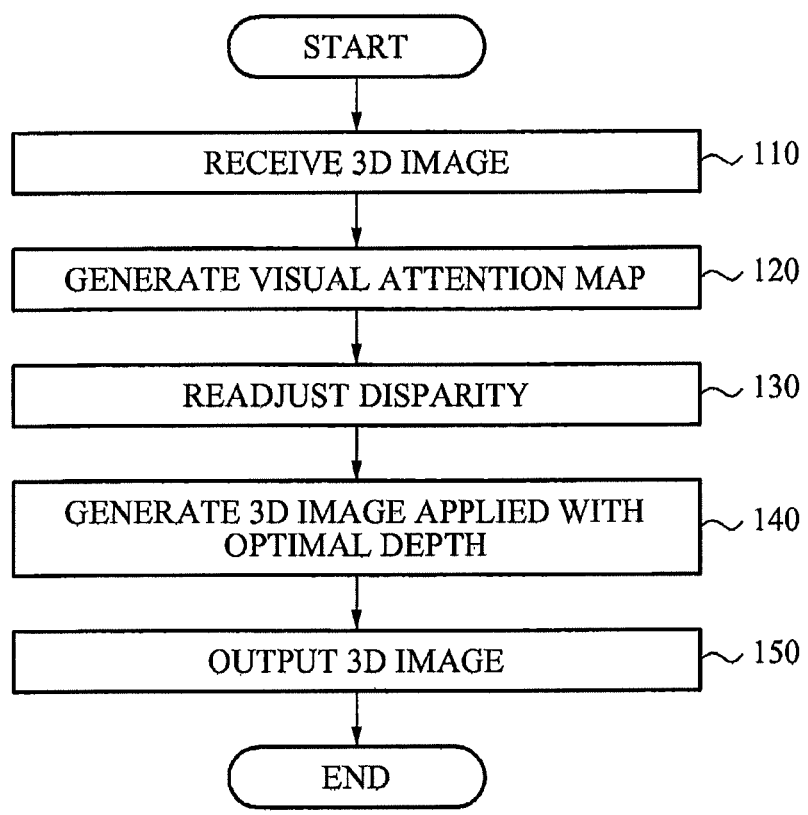
FIG. 1 illustrates an image processing method according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates an image processing method according to an embodiment.

The image processing method may analyze a characteristic of an input three dimensional (3D) image to be provided from a 3D display. The image processing method may decrease a fatigue level resulting from viewing the input 3D image by adjusting disparity information of the input 3D image using the analyzed characteristic.

An image processing apparatus according to embodiments may efficiently and accurately predict a region of interest (ROI) using a visual attention among human visual perception characteristics. Based thereon, the image processing apparatus may enhance a visual perceived depth according to a characteristic of the input 3D image, and may also significantly decrease a visual fatigue.

According to researches on the visual attention in association with human visual perception characteristics, the sense of sight may be an organ that provides ten folds of information compared to the sense of hearing and performs the most key function. Therefore, at least 70% of the whole obtained information may be obtained from visual information. In the 3D image, visual information may function as a major means of input information and the sense of sight may become tactile.

Eyes of a human that perform such a visual function may receive, from ambient environments, a various and large number of information, for example, shapes, colors, distances, motions, lightness, textures, gradients, positions, directions, and the like. Even though a large number of information is input, brain of a human may select and focus on meaningful information in the large number of information coming into eyes. It is referred to as a visual attention or a selective attention. For example, what to see or where to see may be determined using the visual attention or the selective attention.

Hereinafter, an image processing method of an image processing apparatus that may decrease a visual fatigue by readjusting a disparity of an input 3D image according to an embodiment will be described.

Referring to FIG. 1, in operation 11, a 3D image may be input. The input 3D image may include a color image and disparity information. A 3D display device may generate a stereoscopic image or a multi-view image by decoding the color image and the disparity information.

In operation 120, a ROI configuration unit of the image processing apparatus may generate a visual attention map by analyzing the input 3D image.

The ROI configuration unit may divide the input 3D image into a plurality of layers having different depth levels, using disparity information of the 3D input image. Hereinafter, the layer may also be referred as to a region.

The ROI configuration unit may calculate a visual attention level according to a visual model among a plurality of regions, using at least one of color information of each region, disparity information of each region, and motion information of each region. The calculated visual attention level may be expressed in correspondence to a screen and thus, may be understood as a configuration of the visual attention map.

Embodiments of the ROI configuration unit that may generate the visual attention map will be further described with reference to the accompanying drawings.

When the visual attention map is calculated, a disparity adjustment unit of the image processing apparatus may readjust disparity information include in the 3D image input in operation 130.

The above readjustment may be understood as an operation of enabling a portion having a highest visual attention level, verified from the visual attention map, to have a disparity level minimizing a visual fatigue of a human.

According to an embodiment, the disparity level minimizing the visual fatigue may be a disparity corresponding to a point proximate to a display screen. For example, when a point at which a disparity becomes "zero" is understood as the display screen, a disparity of the portion having the highest visual attention level may be adjusted to "zero".

In operation 140, a 3D image generator of the image processing apparatus may generate a 3D image using the readjusted disparity. In operation 150, the generated 3D image, for example, a stereoscopic image may be output.

Through the above process, it is possible to perform image processing that may decrease a visual fatigue and may also maintain or further enhance the relative 3D effect within a screen.

Figure 2:
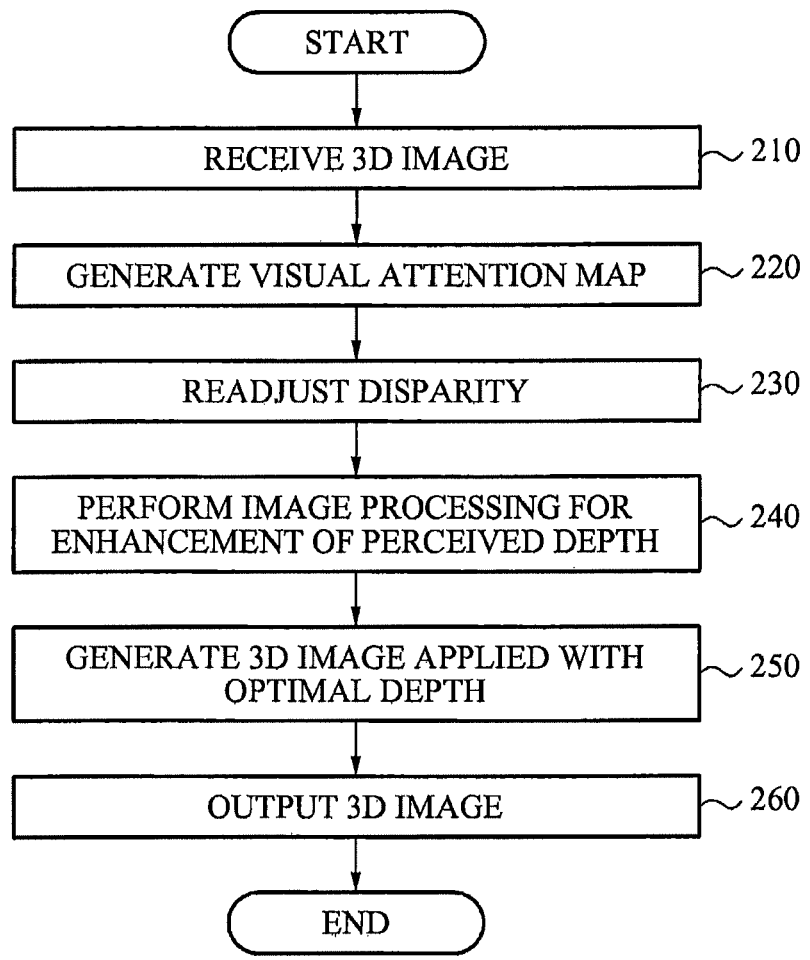
FIG. 2 illustrates an image processing method including a perceived depth enhancement processing process according to an embodiment.

FIG. 2 illustrates an image processing method including a perceived depth enhancement processing process according to an embodiment.

Even though there is a difference between the image processing method of FIG. 1 and the image processing method of FIG. 2 in that a process of enhancing a perceived depth is performed in operation 240 after operation 230, remaining operations, for example, operation 210 of receiving a 3D image, operation 220 of configuring a visual attention map, and operation 230 of readjusting a disparity may be the same as the description made above with reference to FIG. 1.

In addition, operation 250 of generating a 3D image applied with optimal depth and operation 260 of outputting the 3D image after operation 240 may also be the same as the description made above with reference to FIG. 1.

Operation 240 of image processing for enhancing the perceived depth will be described with reference to FIG. 6 through FIG. 8.

Figure 3:
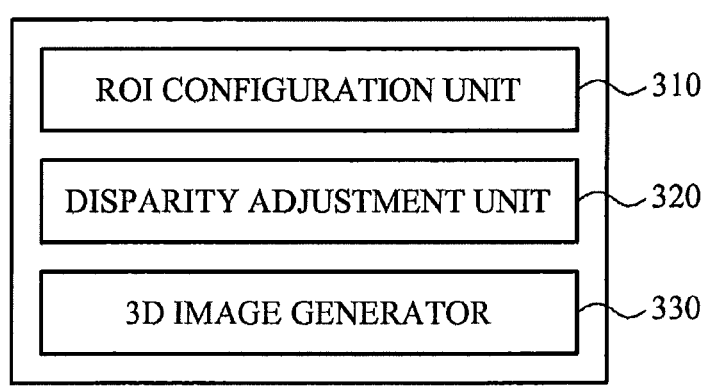
FIG. 3 illustrates an image processing apparatus according to an embodiment.

FIG. 3 illustrates an image processing apparatus according to an embodiment.

When a 3D image is input, a ROI configuration unit 310 may generate a visual attention map by analyzing the input 3D image.

As described above with reference to FIG. 1, the ROI configuration unit 310 may divide the input 3D image into a plurality of regions having different depth levels, using disparity information of the input 3D image.

The ROI configuration unit 310 may calculate a visual attention level according to a visual model among the plurality of regions, using at least one of color information of each region, disparity information of each region, and motion information of each region. The calculated visual attention level may be expressed in correspondence to a screen and thus, may be understood as a configuration of the visual attention map.

An operation of the ROI configuration unit 310 that may generate the visual attention map will be further described with reference to FIG. 4 and FIG. 5.

Using the visual attention map generated by the ROI configuration unit 310, a disparity adjustment unit 320 may adjust a disparity of the input 3D image to achieve an optimal visual fatigue.

A region having a highest visual attention level, verified from the visual attention map, through the disparity adjustment may be moved to a depth at which a visual fatigue of a human may be minimized. A disparity level minimizing the visual fatigue may be a disparity corresponding to a point proximate to a display screen and thus, a disparity of the region having the highest visual attention level may be adjusted to "zero".

An operation of the disparity adjustment unit 320 will be further described with reference to FIG. 6 and FIG. 9 through FIG. 12.

A 3D image generator 330 may generate a 3D image of providing a minimum visual fatigue using the readjusted disparity. An operation of the 3D image generator 330 will be further described with reference to FIG. 7 and FIG. 8.

Figure 4:
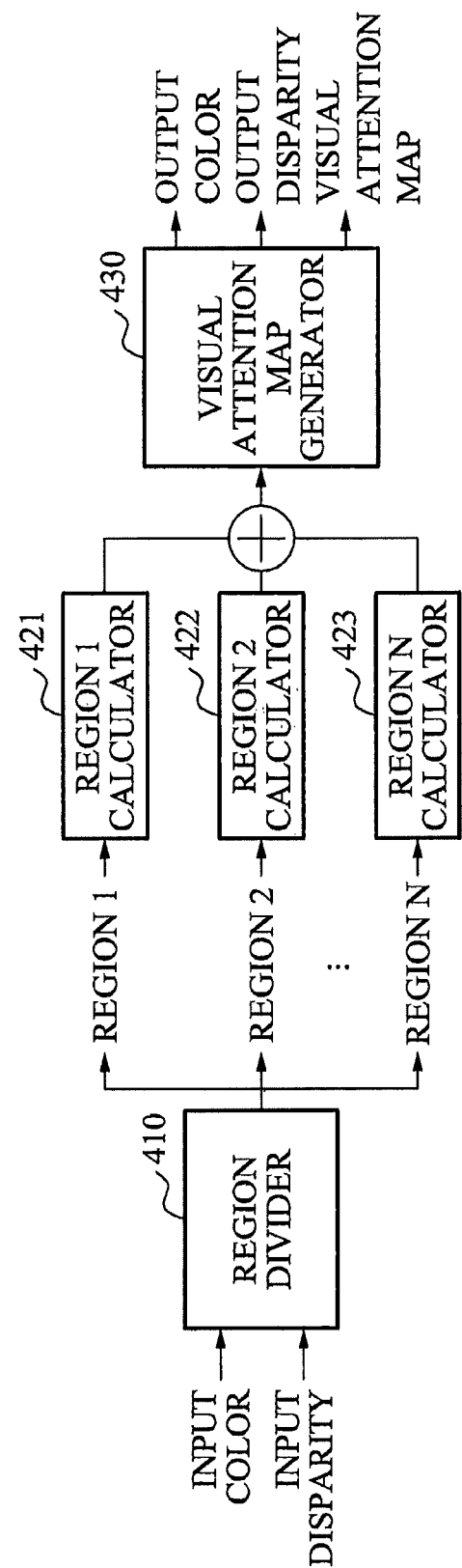
FIG. 4 illustrates a configuration of a region of interest (ROI) configuration unit of the image processing apparatus of FIG. 3 according to an embodiment.

FIG. 4 illustrates a configuration of the ROI configuration unit 310 of the image processing apparatus of FIG. 3 according to an embodiment.

The ROI configuration unit 310 may include a region divider 410, a region 1 calculator 421, a region 2 calculator 422, ..., a region N calculator 423, and a visual attention map calculator 430.

The region divider 410 may divide a depth value distribution of the input 3D image into N regions, using disparity information included in the input 3D image. During the above process, a distribution between a minimum depth value and a maximum depth value may be equivalently divided into N regions.

However, it is only an example and thus, a relatively large number of layers may be assigned to a region around a depth value corresponding to a large number of pixels according to a distribution of depth values. In the case of a depth value corresponding to a small number of pixels, a relatively wide range may be assigned as a single layer. In this example, a depth value based region (layer) division may be adaptively performed per frame over time.

When the depth value distribution is divided into region 1 through region N based on a depth value level, each region calculator may calculate a visual attention level of each region. For example, the region 1 calculator 421 may calculate a visual attention level of region 1, the region 2 calculator 422 may calculate a visual attention level of region 2, and the region N calculator 423 may calculate a visual attention level of region N. The visual attention level may be determined based on at least one of a color, a disparity, and a motion of an object according to a visual recognition model of a human.

The above calculation may be performed so that a relatively high visual attention level may be obtained with respect to a hue viewed by a human with great attention, a portion having a disparity level to be emphasized, and a portion in which an object moves.

The visual attention map calculator 430 may generate the visual attention map with respect to the entire screen using visual attention levels calculated by the region 1 calculator 421, the region 2 calculator 422, ..., the region N calculator 423.

A process of each region calculator that may calculate a region map of a corresponding region will be described with reference to FIG. 5.

Figure 5:
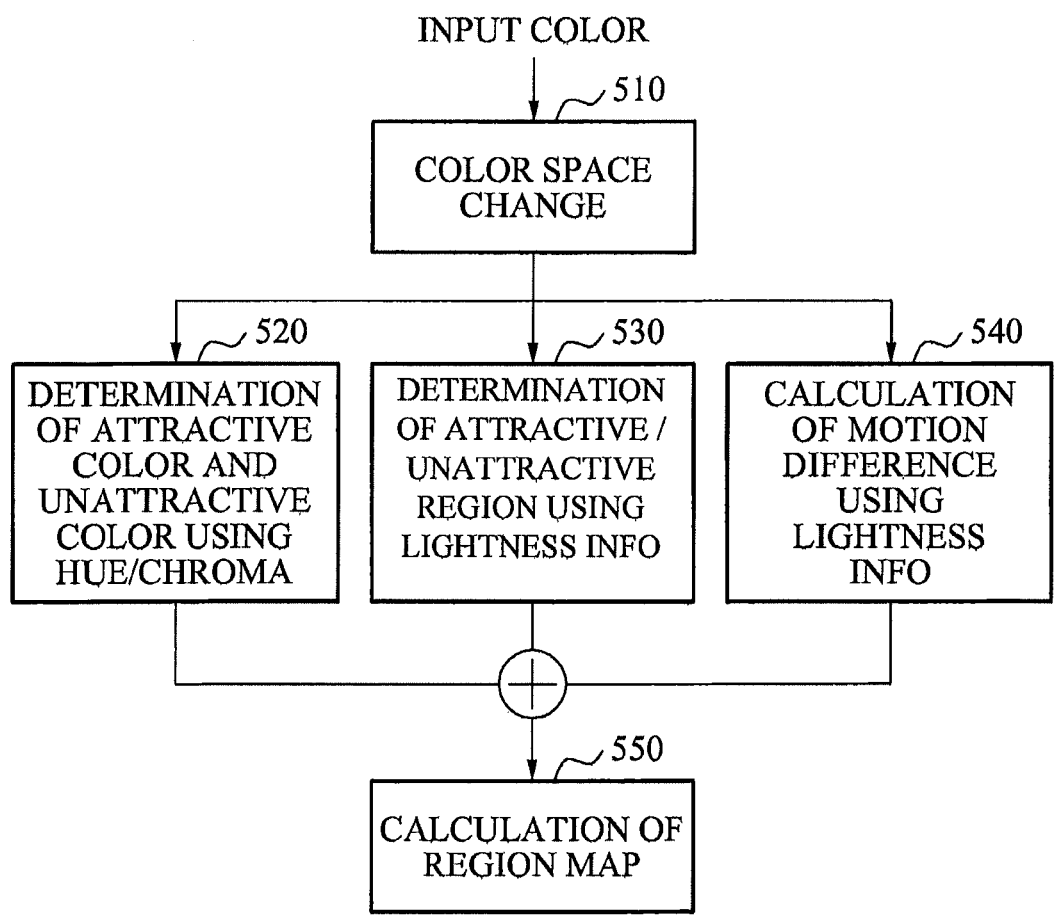
FIG. 5 illustrates a process of calculating, by a ROI configuration unit, a region map according to an embodiment.

FIG. 5 illustrates a process of calculating, by a ROI configuration unit, a region map according to an embodiment.

In operation 510, a color space change may be performed to analyze color information with respect to each region that is divided into N based on a depth value level.

Color information of an input 3D image by red, green, blue (RGB) color space may be converted to a lightness (J), chroma (C), hue quadrature (H) based color space of CIECAM02 that is most similar to human visual perception. Here, J, C, and H of CIECAM02 may indicate a lightness value, a chroma value, and a hue value, respectively.

A color space with respect to the input 3D image may be an RGB digital signal and be unassociated with a human visual system. Therefore, human perception characteristics, for example, a lightness, a chroma, and a hue expressed as a final output of the human visual system may be used.

Each region calculator may generate a color histogram corresponding to each region, for example, each layer using color information obtained from the converted color space. A histogram may be generated based on hue information in the color information.

A hue region to be used may be divided into a hue quadrature or a hue angle of CIECAM02 in the color space that is described as a predetermined region, or may be divided based on a hue value of an LCH color space.

A representative hue capable of representing a corresponding layer may be determined through a color histogram generated for each region. Here, the representative hue may be a color having a largest frequency in the color histogram, and may be referred to a representative hue of the corresponding layer. However, it is only an example and thus, the representative hue may be determined using other methods.

In operation 520, whether the determined representative hue corresponds to an attractive hue region associated with the visual attention or an unattractive hue region may be determined.

In operation 530, whether a corresponding pixel corresponds to a lightness value having a visual attention may be with respect to each pixel corresponding to an attractive color.

In general, when a lightness is low, for example, when it is dark, a hue may not be recognized even in the case of a hue region corresponding to the visual attention. Therefore, a visual attention level may not be calculated to be high. By considering the lightness as above, noise may be removed during a process of calculating the visual attention level.

In operation 540, whether a predetermined pixel corresponds to a moving object may be determined.

In general, when a motion difference is greater, a corresponding portion may require an attention according to the visual attention. Based on the above theoretical presumption, the motion difference may be calculated using the lightness.

In this example, the motion may be based on assumption that panning or undesired shaking of an image input apparatus, for example, a camera barely exists. When a lightness difference for each frame is greater, a corresponding portion may be determined as a portion having an object motion, for example, a portion to be attended.

During the above process, a T0 input frame and a (T0+Δt) input frame may be divided into blocks of a predetermined size. When a difference of pixels values with respect to a block positioned at the same position within two frames is greater than or equal to a predetermined threshold, a motion may be determined to have occurred.

During the above process, it is highly likely that a quickly moving object may be detected as two different regions. In order to integrate two different regions into a single region, when at least a predetermined number of motion detection blocks appear within a block group, a method of displaying the entire block group as a single region may be employed. That is, neighboring blocks instead of individual blocks may be considered.

In operation 550, a region map calculated with respect to each region may be integrated. Accordingly, the entire visual attention map may be configured.

Figure 6:
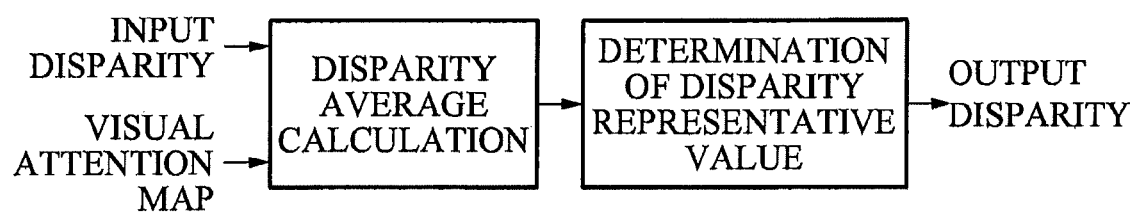
FIG. 6 illustrates a diagram to describe an operation of a disparity adjustment unit of the image processing apparatus of FIG. 3 according to an embodiment.

FIG. 6 illustrates a diagram to describe an operation of the disparity adjustment unit 320 of the image processing apparatus of FIG. 3 according to an embodiment.

The disparity adjustment unit 320 may generate a readjusted disparity using a disparity of an input 3D image and a visual attention map provided from the ROI configuration unit 310.

Figure 7:
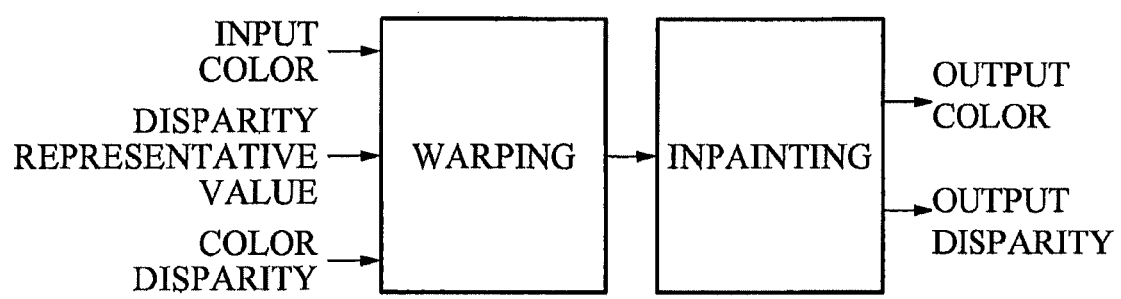
FIG. 7 illustrates a diagram to describe an operation of a three dimensional (3D) image generator of the image processing apparatus according to an embodiment.

FIG. 7 illustrates a diagram to describe an operation of the 3D image generator 330 of the image processing apparatus according to an embodiment.

A disparity having a highest interest level, for example, a disparity to be attended may be determined as a representative value using a visual attention map.

When the visual attention map configured by the ROI configuration unit 310 and region disparities divided into N based on a predetermined threshold are input during the above process, a distribution of pixels having a largest visual attention value in the visual attention map may be verified. A region corresponding to the pixels may be discovered and an average of disparities corresponding to a depth value of the discovered, or a representative value region thereof may be obtained.

A plurality of methods of setting a representative value to be readjusted may be employed. The representative value may be set by exemplarily setting the average value.

The disparity representative value a determined as above may be used when moving a depth. For example, the determined disparity representative value a may be used to change a difference between disparity information of each pixel corresponding to a ROI or a region of non-interest and the disparity representative value a as a disparity value of a corresponding pixel. By applying a calculated final disparity value for each pixel, the ROI may be positioned on a display and other pixels excluding the ROI may be moved based on the disparity representative value a of the ROI. The disparity described herein may be one of terms indicating a perceived depth and thus, other terms indicating the perceived depth may be used in addition to the disparity.

Figure 8:
FIG. 8 illustrates a diagram to describe an operation of a 3D effect enhancement unit included in an image processing apparatus according to an embodiment.

FIG. 8 illustrates a diagram to describe an operation of a 3D effect enhancement unit included in an image processing apparatus according to an embodiment.

When a disparity is readjusted, a 3D image generator may function to render again a 3D image having a disparity different from an input image using the readjusted disparity. A depth image based rendering (DIBR) method may be used for the above operation. The DIBR method may render an image at a predetermined view using a reference image and a depth image including distance information corresponding to each pixel of the reference image. Also, a scene at a predetermined view may be generated using DIBR technology. The following Equation 1 may be commonly used.

$$u_v = u_r + \beta \cdot d \quad \text{[Equation 1]}$$

In Equation 1, $U_v$ denotes a virtual view desired to be obtained, $u_r$ denotes an input, d denotes a disparity, and β denotes a predetermined number that is changeable when setting a desired view. For example, when an image is projected again in a 3D space using a single reference image and depth information of a depth image, a left image may move objects within the image to the right and a right image may move the objects to the left compared to an original color image.

FIGS. 9A and 9B, and FIGS. 10A and 10B illustrate diagrams to describe a difference before and after adjusting a disparity by a 3D image generator of an image processing apparatus according to an embodiment.

FIGS. 9A and 9B, and FIGS. 10A and 10B illustrate top down views of objects to be displayed in a 3D image and a display screen.

An object motion may be determined in proportion to a perceived depth. When objects are moved using the above method, a perceived depth before a disparity translation corresponding to a depth may be the same as a perceived depth after the disparity translation as shown in FIGS. 9A and 9B, and FIGS. 10A and 10B.

Figure 9A:
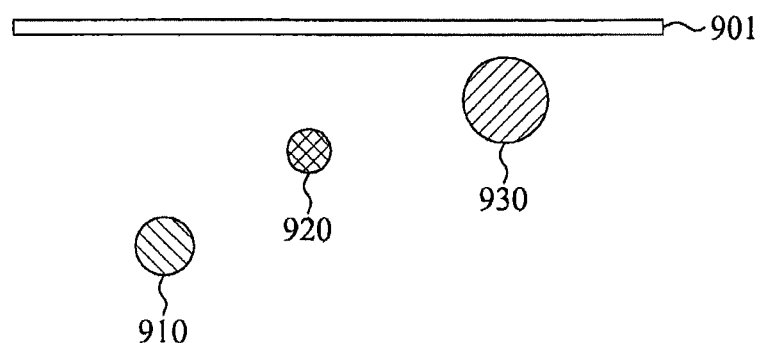
FIGS. 9A and 9B, and FIGS. 10A and 10B illustrate diagrams to describe a difference before and after adjusting a disparity by a 3D image generator of an image processing apparatus according to an embodiment.
Figure 9B:
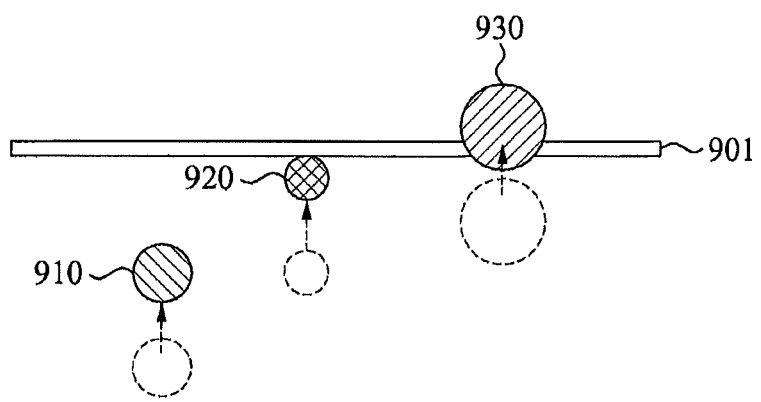
Figure 10A:
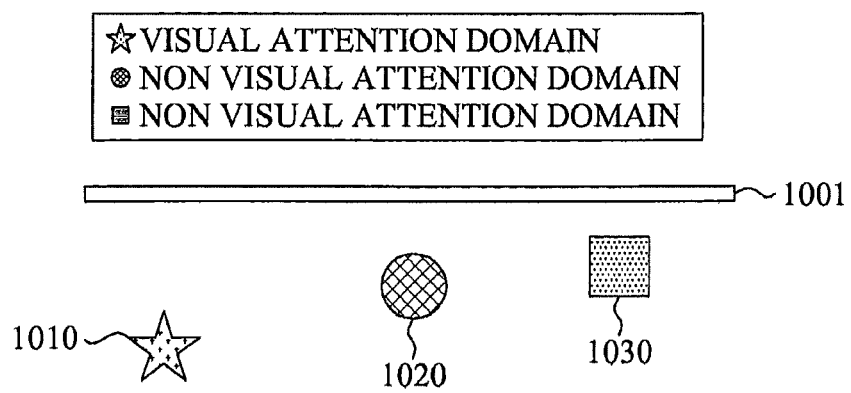
Figure 10B:
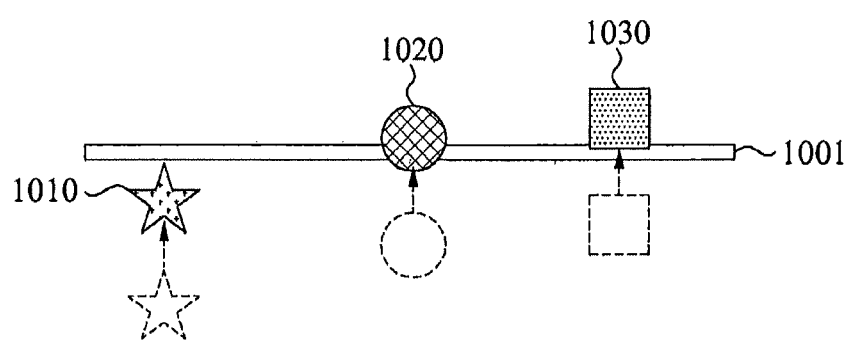

For example, even though depth values of objects 910, 920, and 930 may be changed from FIG. 9A to FIG. 9B to minimize a visual fatigue, the relative 3D effect among the objects 910, 920, and 930 may be maintained.

Due to a human visual characteristic, the 3D effect may be enhanced to be greater than or equal to a level at which the 3D effect is maintained.

Referring again to FIGS. 10A and 10B, a disparity may be reduced so that a representative object 1010 having a high visual attention may be around a screen 1001. However, a relative 3D effect difference with other objects 1020 and 1030 may be maintained or enhanced.

The above description may be applied as is to a case where the objects 910, 920, and 930 are moved to be close to a screen 901 in FIG. 9B.

Figure 11:
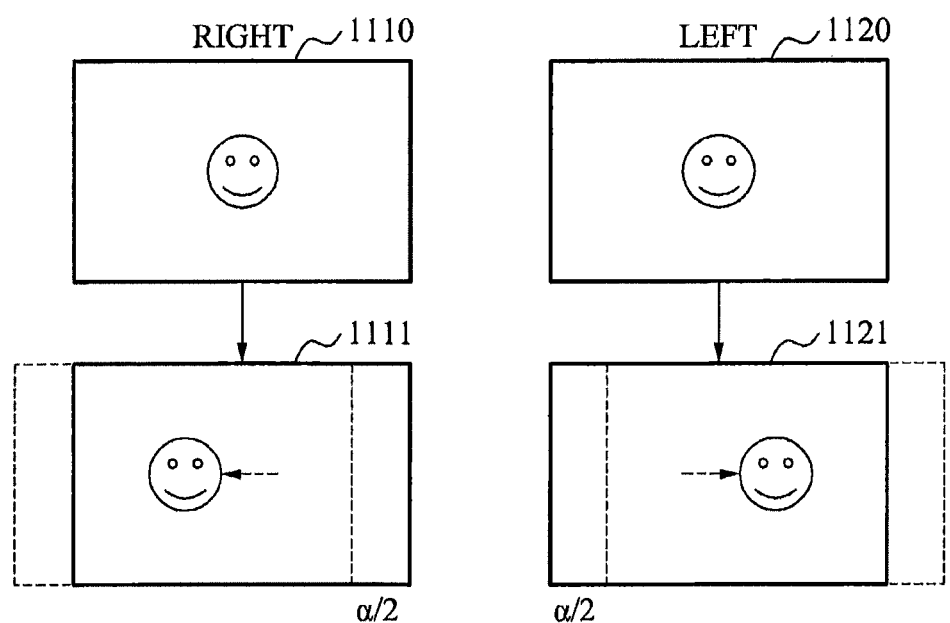
FIG. 11 illustrates diagrams to describe a process of generating a positive perceived depth 3D image using an image processing method according to an embodiment.

FIG. 11 illustrates diagrams to describe a process of generating a positive perceived depth 3D image using an image processing method according to an embodiment.

FIG. 11 shows an example in which an input 3D image is moved to be positioned on a positive perceived depth, for example, on the rear of a display.

When the input 3D image is moved by a disparity representative value a in FIG. 11, hole filling may be performed by cutting the input 3D image by $\alpha/2$ in each of a left image and a right image, and by inpainting an empty space cut by $\alpha/2$.

Figure 12:
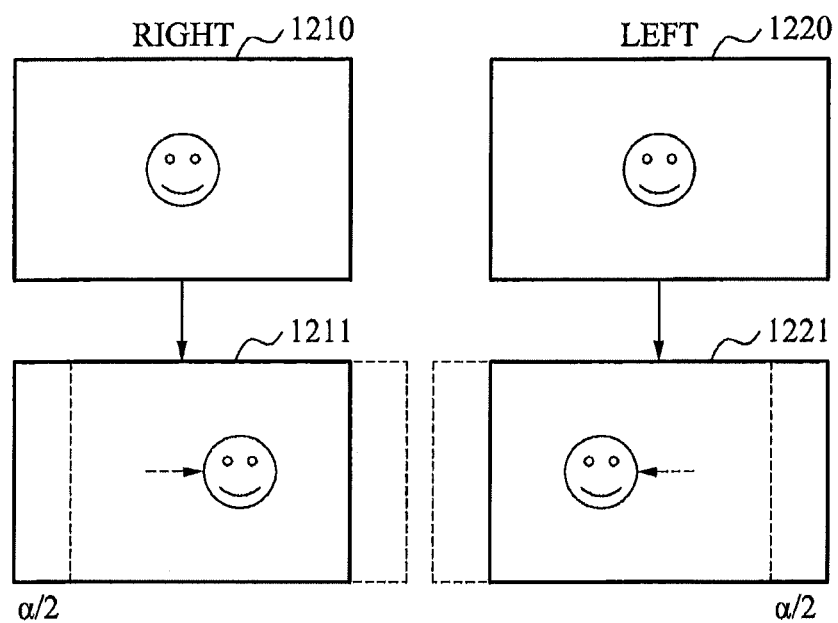
FIG. 12 illustrates diagrams to describe a process of generating a negative perceived depth 3D image using an image processing method according to an embodiment.

FIG. 12 illustrates diagrams to describe a process of generating a negative perceived depth 3D image using an image processing method according to an embodiment.

FIG. 12 shows an example in which an input 3D image is moved to appear protruded from the front of a display, as a negative perceived depth. Similar to the example of the positive perceived depth, FIG. 12 shows an example of cutting the input 3D image by positive $\alpha/2$ to be moved and by performing recovery corresponding to cut $\alpha/2$.

Specific processing may be understood with reference to FIG. 7.

Even though all of the above examples assume that a final 3D image is output as a stereoscopic image, it is straightforward that the above description may also be applied to a multi-view image.

Accordingly, even though there may be slight difference in rendering, various view images may be reconfigured using the same method as the method used for the stereoscopic image.

When performing image processing for the perceived depth enhancement to be generated as a new output in FIG. 7 and FIG. 8, it is possible to generate a more realist image by applying texture related technology of maintaining a perceived depth in a 3D image and generating a fatigue free image.

Initially, after increasing a contrast of an input image through global lightness mapping, a texture type may be analyzed by verifying a characteristic of a ROI. By applying a predetermined lightness mapping method based on the analyzed texture type, an image having a further perceived depth may be provided using a texture processing method suitable for a characteristic of a region that requires a visual attention. In addition, many enhancement schemes may be employed and a texture enhancement scheme is disclosed herein as one example.

Compared to a conventional method of enhancing a perceived depth using an aerial perspective, the aforementioned embodiments may very efficiently decrease a visual fatigue. The method of enhancing the perceived depth using the aerial perspective may correspond to a method of enhancing a contrast in the case of a near side region and decreasing the contrast in the case of a far side region using depth information in an input 3D image. Accordingly, a perceived depth, for example, the 3D effect may be enhanced, whereas a visual fatigue may not be sufficiently reduced compared to the embodiments.

In addition, in the case of a conventional method of obtaining a ROI using only a view distance and depth information without using human visual system characteristics, and uniformly adjusting the perceived depth of near/far regions based on a distance from the ROI, the visual fatigue may globally decrease to some levels, whereas the perceived depth may not be achieved, which is opposite to an authentic role of a 3D display.

However, according to embodiments, human visual system characteristics may be used to enhance the perceived depth and to decrease the visual fatigue. A ROI corresponding to a visual attention in the human visual perception characteristics may be efficiently selected and an image may be replayed so that the ROI may have a disparity level minimizing the visual fatigue. Accordingly, it is possible to decrease the visual fatigue and to enhance the perceived depth.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
a processor configured to adjust disparity information of an image, based on a visual attention level,
wherein, to adjust the disparity information, the processor is configured to selectively adjust disparity information of the image by reducing disparities for one or more select portions of the image determined to have respective high visual attention levels, and
wherein the image is a three dimensional (3D) image.

2. The image processing apparatus of claim 1, wherein the processor is further
configured to enhance a perceived depth by applying a texture enhancement scheme based on a texture type of a region to a visual attention map that is generated according to a calculated visual attention level.

3. The image processing apparatus of claim 1, wherein the processor is further configured to adjust the disparity information based on a visual attention level of a region of a visual attention map that is generated according to a calculated visual attention level.

4. An image processing apparatus, comprising:
a processor configured to adjust disparity information of an image, based on visual attention levels of the image, wherein, to adjust the disparity information, the processor is configured to adjust the disparity information if a visual attention level of a portion of the image is greater than or equal to a threshold.

5. The image processing apparatus of claim 1, wherein the processor is further configured to adjust the disparity information based on a visual attention level of an object in the image.

6. The image processing apparatus of claim 5, wherein the processor is further configured to adjust disparity information of other objects in the image based on disparity information of the object when the object is selected to be a reference.

7. An image processing method, comprising:
adjusting, using at least one processing device, disparity information of an image, based on a visual attention level,
wherein the adjusting comprises adjusting the disparity information of the image by reducing disparities for one or more select portions of the image determined to have respective high visual attention levels, and
wherein the image is a three dimensional (3D) image.

8. The method of claim 7, further comprising:
enhancing, using at least one processing device, a perceived depth by applying a texture enhancement scheme based on a texture type of a predetermined region to a visual attention map that is generated according to a calculated visual attention level.

9. The method of claim 7, wherein the adjusting further comprises adjusting the disparity information based on a visual attention level of a region of a visual attention map that is generated according to a calculated visual attention level.

10. An image processing method, comprising:
adjusting, using at least one processing device, disparity information of an image, based on visual attention levels of the image,
wherein the adjusting comprises adjusting the disparity information if a visual attention level of a portion of the image is greater than or equal to a threshold.

11. The method of claim 7, wherein the adjusting further comprises adjusting the disparity information based on a visual attention level of an object in the image.

12. The method of claim 11, wherein the adjusting further comprises adjusting disparity information of other objects in the image based on disparity information of the object upon the object being selected to be a reference.

* * * * *